(12) United States Patent
Roth

(10) Patent No.: US 8,038,186 B2
(45) Date of Patent: Oct. 18, 2011

(54) CARRIER SUPPORT FOR ATTACHING TO A MOTOR VEHICLE

(76) Inventor: Russell W. Roth, Ashville, OH (US)

( * ) Notice: Subject to any disclaimer, the term of this patent is extended or adjusted under 35 U.S.C. 154(b) by 237 days.

(21) Appl. No.: 12/326,148

(22) Filed: Dec. 2, 2008

(65) Prior Publication Data

US 2010/0133860 A1 Jun. 3, 2010

(51) Int. Cl.
*B60R 19/24* (2006.01)
(52) U.S. Cl. .......................... 293/117; 52/843; D12/169
(58) Field of Classification Search ................ 29/896.6, 29/897.35, 897.2; 293/117, 120, 122, 142, 293/143, 154, 155, 102, 144; 52/831, 836, 52/843, 845, 846; D12/163, 167, 169, 172
See application file for complete search history.

(56) References Cited

U.S. PATENT DOCUMENTS

| | | | | |
|---|---|---|---|---|
| 1,532,028 A * | 3/1925 | Beach | ............................ | 293/143 |
| 1,820,660 A * | 8/1931 | Gilbert | ............................ | 52/845 |
| 2,139,788 A * | 12/1938 | Woolson | .................... | 29/897.31 |
| 3,176,903 A * | 4/1965 | Farley | ............................ | 224/490 |
| 3,578,358 A * | 5/1971 | Reynolds | ....................... | 280/500 |
| 3,682,360 A * | 8/1972 | Fletcher et al. | ............... | 224/491 |
| 3,785,541 A * | 1/1974 | Sibley | ............................ | 224/408 |
| 4,023,841 A * | 5/1977 | Wong | ............................. | 293/142 |
| 4,193,621 A * | 3/1980 | Peichl et al. | .................. | 293/142 |
| 4,266,817 A * | 5/1981 | Mason et al. | .................. | 293/117 |
| 4,397,490 A * | 8/1983 | Evans et al. | ................... | 293/120 |
| 4,466,646 A * | 8/1984 | Delmastro et al. | ............. | 293/117 |
| 4,610,458 A * | 9/1986 | Garnham | ....................... | 280/495 |
| 4,950,010 A * | 8/1990 | Denny | ............................ | 293/117 |
| D324,360 S * | 3/1992 | Ueno | ............................ | D12/163 |
| 5,178,425 A * | 1/1993 | Kumagai et al. | ............... | 293/120 |
| 5,269,574 A * | 12/1993 | Bhutani et al. | ................. | 293/102 |
| 5,551,135 A * | 9/1996 | Powers, III | ...................... | 29/6.1 |
| 5,618,074 A * | 4/1997 | Weast | ............................. | 293/155 |
| 5,628,536 A * | 5/1997 | Fulkerson | ...................... | 293/117 |
| 6,170,217 B1 * | 1/2001 | Meyer | ............................. | 52/693 |
| 6,338,510 B1 * | 1/2002 | Kanamori et al. | ............. | 293/154 |
| 6,361,092 B1 * | 3/2002 | Eagle et al. | .................... | 293/102 |
| 6,398,275 B1 * | 6/2002 | Hartel et al. | ................... | 293/102 |
| 6,398,276 B1 * | 6/2002 | Smith | ............................ | 293/142 |
| 6,540,277 B2 * | 4/2003 | McCoy et al. | ................. | 293/117 |
| D480,997 S * | 10/2003 | DeBerti | ........................ | D12/163 |
| 6,698,968 B2 * | 3/2004 | Kajiwara et al. | .............. | 403/337 |
| 6,729,429 B2 * | 5/2004 | Takahashi | ...................... | 180/271 |
| 6,827,377 B2 * | 12/2004 | Ferrigan | ........................ | 293/117 |
| 6,866,333 B2 * | 3/2005 | Saitou | ........................ | 296/203.02 |
| 6,971,690 B2 * | 12/2005 | Evans et al. | .................... | 293/102 |

(Continued)

FOREIGN PATENT DOCUMENTS

JP      57172848 A    * 10/1982

*Primary Examiner* — Glenn Dayoan
*Assistant Examiner* — Paul Chenevert
(74) *Attorney, Agent, or Firm* — Bernhard P. Molldrem, Jr.

(57) ABSTRACT

A carrier support arrangement that attaches to a vehicle between a rear bumper crash bar and mounting pads that are provided at the rear of the body of the vehicle. The carrier support is formed of a transverse support bar that has a modified hollow tubular beam construction, with attachment lands its ends. Tubular socket members receive attachment rods of the associated carrier. The tubular beam construction if formed of an upper member and lower member welded together. The web portions of the beam have a series of triangular cutouts, leaving a series of diagonal struts. This construction achieves a weight savings without sacrifice of strength or torsion resistance.

14 Claims, 5 Drawing Sheets

U.S. PATENT DOCUMENTS

| | | | |
|---|---|---|---|
| 7,257,932 B2 * | 8/2007 | Ng | 52/634 |
| D560,571 S * | 1/2008 | Rester | D12/163 |
| 7,490,877 B2 * | 2/2009 | Asahi et al. | 293/155 |
| 2003/0227184 A1 * | 12/2003 | Evans | 293/120 |
| 2004/0041417 A1 * | 3/2004 | Ferrigan | 293/117 |
| 2009/0115209 A1 * | 5/2009 | Roth | 293/155 |
| 2009/0315345 A1 * | 12/2009 | Eckert et al. | 293/117 |

* cited by examiner

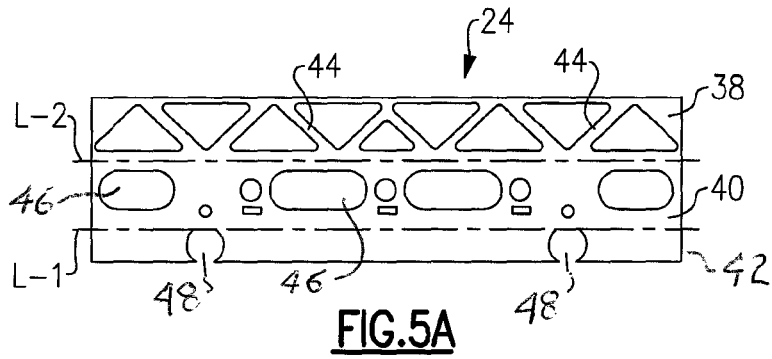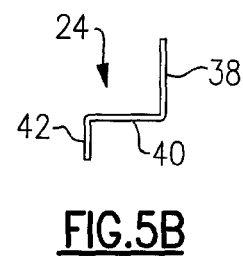
FIG.5A  FIG.5B
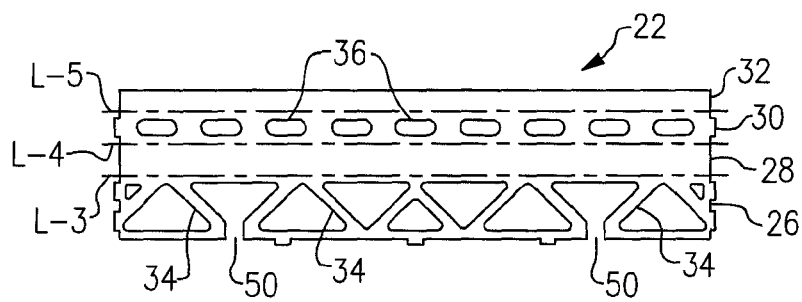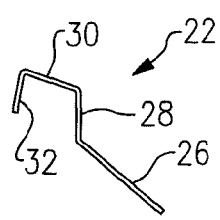
FIG.6A  FIG.6B
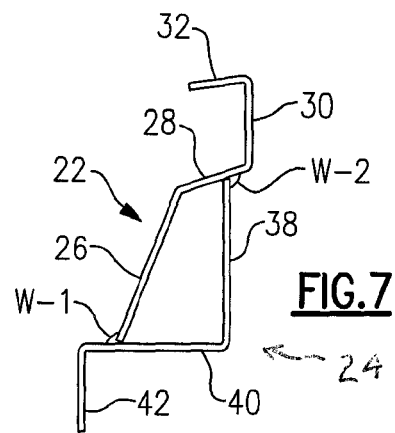
FIG.7

CARRIER SUPPORT FOR ATTACHING TO A MOTOR VEHICLE

BACKGROUND OF THE INVENTION

This invention relates to mounts for attaching a trailer hitch, bike rack, ski rack, or other carrier system for a motor vehicle. The invention is more particularly concerned with a support arrangement that attaches to a vehicle between a rear bumper crash bar and mounts therefor that are provided at the rear of the body of the vehicle.

The device of this invention may be employed on an automobile of the type in which the rear bumper is mounted onto the body of the vehicle, which may be a sedan, station wagon, hatchback or other light vehicle. The vehicle design allows for a structural bumper support, e.g., a crash bar, to be mounted on spaced apart attachment pads on the vehicle body. Then the decorative cover of the bumper is mounted over the crash bar. There may be conventional bumper components provided, e.g., foam shock absorber. A transverse support beam for the carrier device has left and right plates, or lands, which are apertured so they may be bolted in place, and these are sandwiched between the vehicle attachment pads and the bumper crash bar. The support beam has welded to it a pair of laterally-spaced tubular receptacles or ports that project to rearward. The ports serve as sockets into which the trailer hitch, bike rack, ski rack, or other carrier device is mounted.

A prior model load carrier of this type is described in U.S. Pat. No. 6,827,377 to Ferrigan. In that model, the transverse support beam is made of a heavy-grade steel, which adds considerably to the vehicle weight. The transverse beam is formed of a heavy-gauge steel, and has full flanges at the upper and lower edges of a beam web.

The applicant of this invention has recently designed an improved carrier support that is adapted to a match the rear bumper design for the recent model years for one vehicle on which this arrangement can be installed, namely the Mini™, of which several models (e.g., COOPER, COOPER D, COOPER S, CLUBMAN) are available. That design is described in the U.S. Pat. Appln. Pub. No. 2009/0115209 A1. The contents of that published patent application are incorporated by reference herein. That carrier support employs a carrier support beam of a modified C-channel design, and has a pair of cantilevered mounting bars that project forward to mate with square tubular members that are present at the rear of the vehicle. However, not all vehicles have such square tubular members available, and it has been desired to create a support beam of sufficient strength that it can be supported on the bumper mounting pads, but also can be constructed so it does not add significantly to the overall weight of the vehicle.

OBJECTS AND SUMMARY OF THE INVENTION

Accordingly, it is an object of the present invention to improve the weight and utility aspects of the support member on which a trailer hitch, bike rack, ski rack or the like can be installed, and which can be adapted to vehicles that do not accommodate the current design of carrier supports.

It is another object to provide a carrier support which can also be installed on vehicles with earlier models of bumpers and bumper mounts.

A specific object was to create an improved design for the carrier support so that it could be made lighter in weight without sacrifice of strength or durability.

In accordance with one aspect of the present invention, a carrier support is provided which attaches to a motor vehicle of the type in which there are rear bumper attachment pads for mounting a frame, e.g., a crash bar, of the rear bumper. That is, the carrier support is mounted onto the rear bumper attachment pads, between the latter and the bumper crash bar on which the rear bumper is mounted. The carrier support is basically formed of a transverse support beam, with left and right support lands formed at ends of the transverse support beam. These lands are adapted to be mounted onto respective ones of the bumper attachment pads. A pair of spaced-apart tubular socket members or ports are affixed to the transverse support beam and these extend rearward therefrom, and receive the attachment rods of a carrier device to that is to be removably supported on it. This structure, to this point, generally corresponds to what is shown in earlier U.S. Pat. No. 6,827,377 and Pub. No. 2009/0115209 A1.

However, in this invention, the transverse support beam is improved in that it is formed as a modified tubular beam having a lower flange and an upper flange, a rearward web member, and an upper web member, as shown in the accompanying Drawing Figures and as herein described. This can have a generally trapezoidal cross section, as illustrated in connection with a preferred embodiment. The forward and rearward web members can each have a plurality of triangular cutouts formed in them, so as to define a series of diagonal struts across the web portions. This relieves a significant fraction of the weight of the support beam, but without sacrificing its structural strength or its resistance to twisting forces. The support beam preferably also has a reinforcing lip that extends downward from a rear edge of the lower flange, with the tubular socket members penetrating through cutouts in the reinforcing lip. The transverse support beam has a web with upper and lower flanges. The upper flange extends rearward from upper edge of the web for a first flange width, and the lower flange extends rearward from the lower edge of the web for a second flange width. The lower flange has a reinforcing lip extending downward from the rear edge of the lower flange.

The transverse support beam may further comprise a vertical web member that extends upwards from a forward edge of the upper flange, with a reinforcing lip that extends rearward from an upper edge of the vertical web member. The vertical web member can also have a series of weight-relieving cutouts that extend across it.

In a preferred construction, left and right gussets or end plates are disposed transversely to the upper flange, the lower flange forward web member and the rearward web member, and are affixed at left and right ends thereof. The left and right support lands extend outward from these left and right end plates. Also, in this embodiment, the support lands are each formed of a vertical apertured attachment plate, with a horizontal flange that extends rearward from the attachment plate, and each of the attachment plates is in the form of a rectangular frame defined by a central cutout, with attachment apertures or openings formed in the rectangular frame.

The transverse support beam of modified hollow tubular beam construction is favorably formed of two-part construction, with a first sheet or blank and a second sheet or blank of structural metal which are bent into shape and then welded together. The first sheet is formed into the forward vertical web member and the lower flange which extends rearward from a bottom edge of the forward web member, and with its reinforcing lip extending downward from a rear (proximal) edge of the lower flange. The second sheet is formed into the rearward (proximal) web member, which is welded to the lower flange, the upper flange which extends generally forward (distally) from an upper edge of the rearward web member, with an upper edge of the forward web member being welded to the upper flange, and the vertical web member that extends upward from a forward edge of the upper flange. The generally triangular cutouts are formed in at least one (preferably, in both) of the forward web member and the rearward web member. Cutouts for the tubular socket members are formed into the reinforcing lip of the second sheet.

In one embodiment, the first and second sheets are formed of a sheet steel of a thickness of 0.105 to 0.145 inches, with 50,000 to 100,000 psi yield strength. The rearward web member and the upper flange meet at an obtuse angle (e.g., about 130 degrees) with the front web member leaning forward towards the forward web member. This gives the support beam a trapezoidal cross section, with the appearance of a triangle with its upper apex truncated.

In some preferred versions, the transverse support beam can be pressed or extruded of an aluminum alloy, providing even greater weight savings.

Once the carrier support is suitably bolted in place on the bumper mounting pads of the vehicle, the bumper frame or crash bar is mounted on top of the carrier support, and the decorative plastic bumper cover is mounted onto the crash bar. Because the bumper cover is made of a plastic resin material, openings can be formed easily into the cover to accommodate the two ports or sockets.

With this construction, the dynamic forces of towing and twisting are transferred to structural points on the vehicle's frame. This also enhances the rear collision strength of the bumper system which is reinstalled on top of the support beam.

The above and many other objects, features, and advantages of this invention will be more fully appreciated from the ensuing description of a preferred embodiment, which is to be read in conjunction with the accompanying Drawing.

BRIEF DESCRIPTION OF THE DRAWING

FIG. 4 is a perspective of a pin tube employed in this embodiment.

FIG. 5A is a plan view of the stamped or cut blank for a first portion of the transverse beam employed in this embodiment.

FIG. 5B is a side view thereof after having been bent along its fold lines.

FIG. 6A is a plan view of the stamped or cut blank for a second portion of the transverse beam employed in this embodiment.

FIG. 6B is a side view thereof after having been bent along its fold lines.

FIG. 7 is a cross section showing the profile of the beam construction.

DETAILED DESCRIPTION OF A PREFERRED EMBODIMENT

Figure 1:
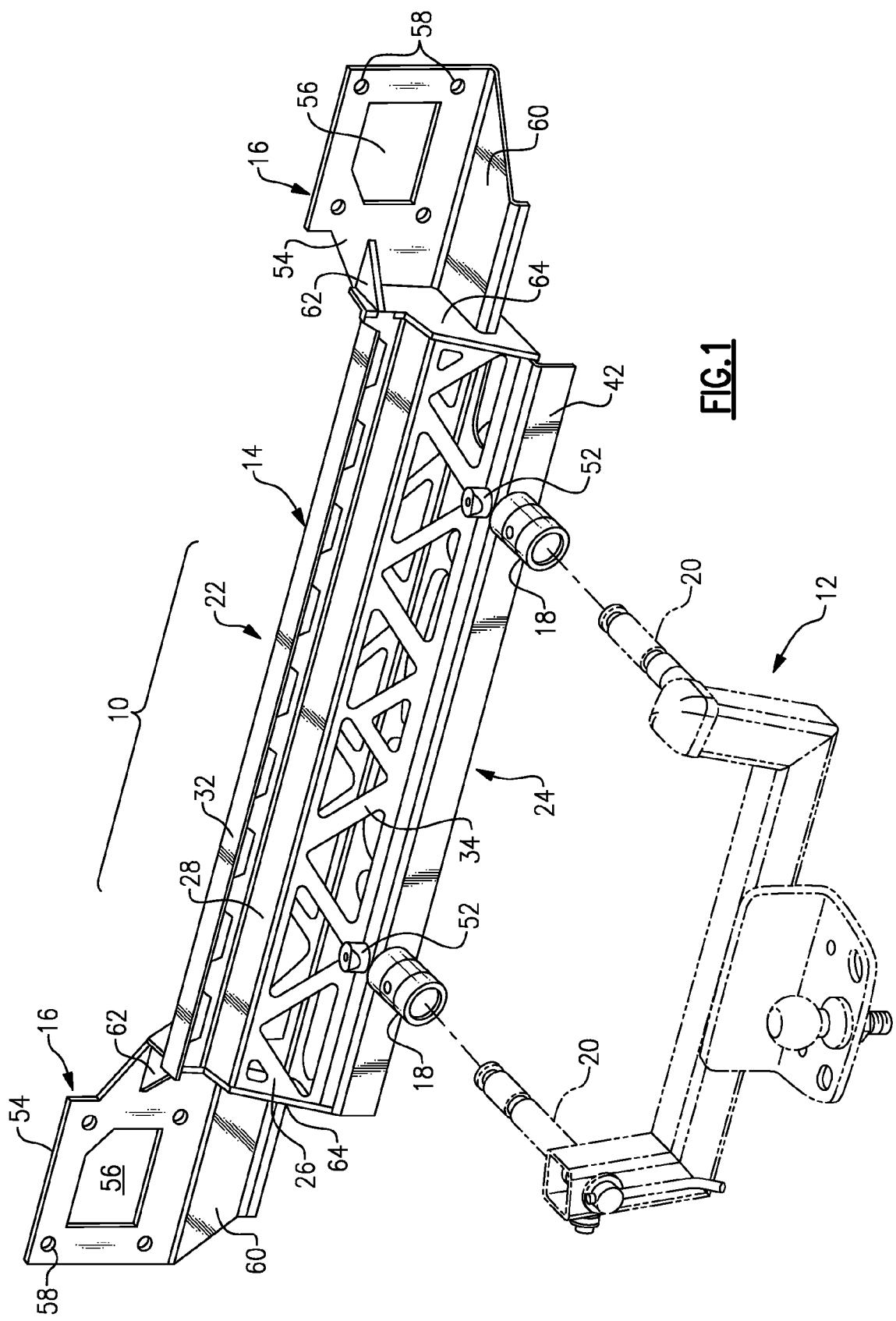
FIG. 1 is a perspective view of the carrier support device according to one embodiment of the present invention, with an associated trailer hitch attachment shown in broken line.
Figure 2:
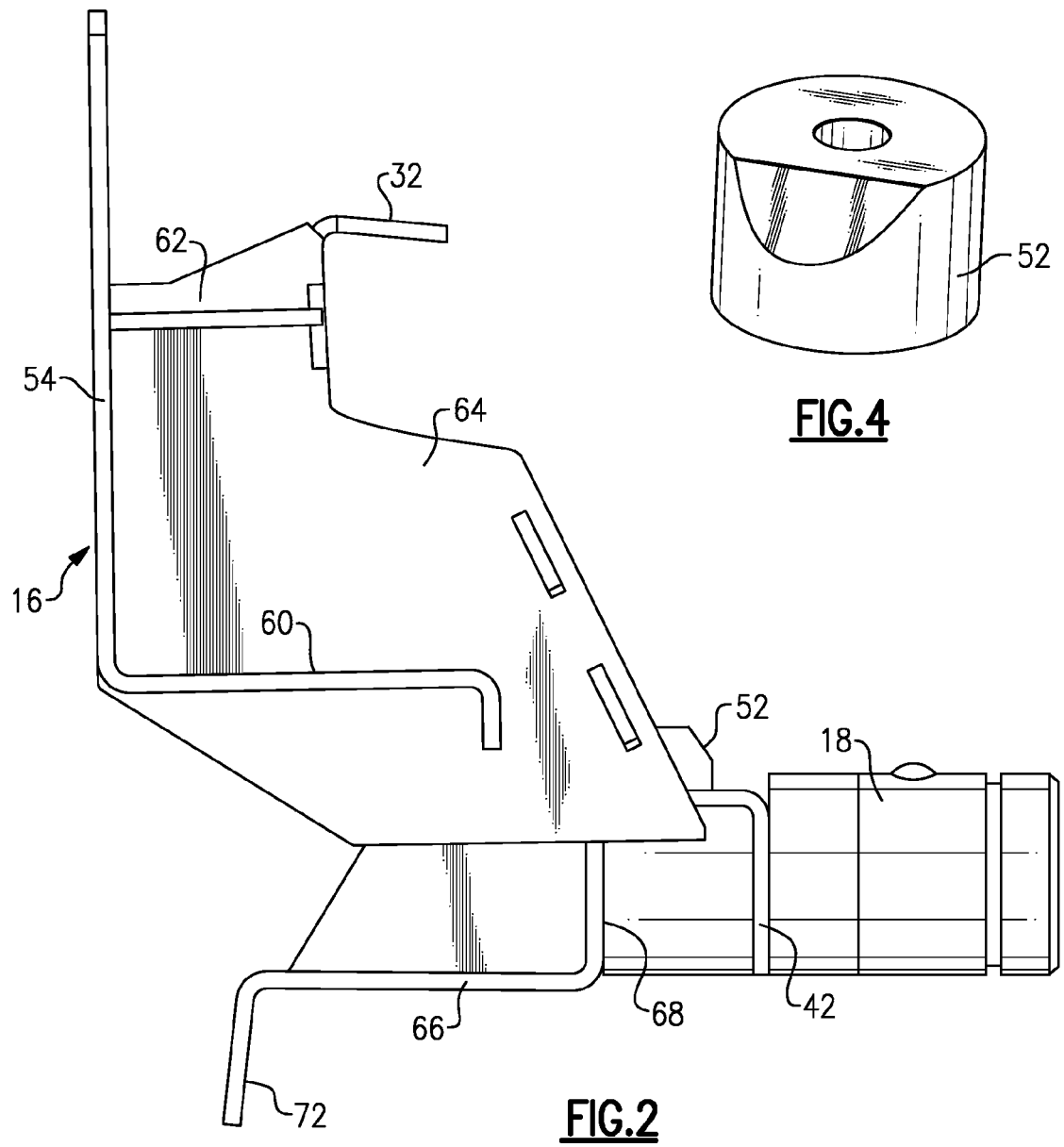
FIG. 2 is left side elevation of the carrier support device of this embodiment.

With reference now to the Drawing, and initially to FIG. 1, a support device 10 for a carrier is shown according to one possible embodiment of this invention. The carrier shown here is a trailer ball hitch 12, but could be a bike rack, ski rack, or other similar item that is to be mounted at the rear of a motor vehicle to hold or carry some item or cargo. This support device 10 is intended to be mounted onto bumper attachment pads that are provided at the rear of the vehicle, and may be affixed to the vehicle generally as discussed in prior U.S. Pat. No. 6,827,377. The support device comprises a transverse support beam 14, which is generally in the form of a modified tube beam, as described in detail below, with web, flanges, and reinforcing lips. There are attachment lands 16, i.e., flat apertured panels, situated at left and right end portions of the support beam 14, and these serve as the means for attachment to the vehicle, and are sandwiched between the vehicle rear bumper attachment pads and rear bumper crash bar or frame, as also discussed in U.S. Pat. No. 6,827,377.

Left and right tubular sockets or attachment ports 18 are also affixed to the transverse support beam 14 at spaced locations. These may be directly affixed (i.e., welded, riveted or bolted) to the support beam 14, as shown. These ports 18 serve as female members for receiving male attachment rods 20 on the carrier device 12 for mounting to the carrier support 10.

The details of the support beam 14 and orientation of the various components as described here are shown in FIGS. 2 to 7.

The sockets or ports 18 are round steel tube with an inner diameter of about 1 1/16 inch to receive the horizontal bolts or posts 20 of the carrier device.

The manner of mounting of the carrier support device 10 at the rear of a vehicle is similar to the method described in the earlier U.S. Pat. No. 6,827,377. The attachment lands 16 of the carrier support member are bolted in place onto the attachment pads at the rear of the vehicle body, and then the rear bumper frame is reinstalled, also using the same attachment pads. The decorative cover is installed over the rear bumper frame. Prior to reinstallation of the bumper cover, openings are formed in the cover for the tubular ports 18.

Figure 3:
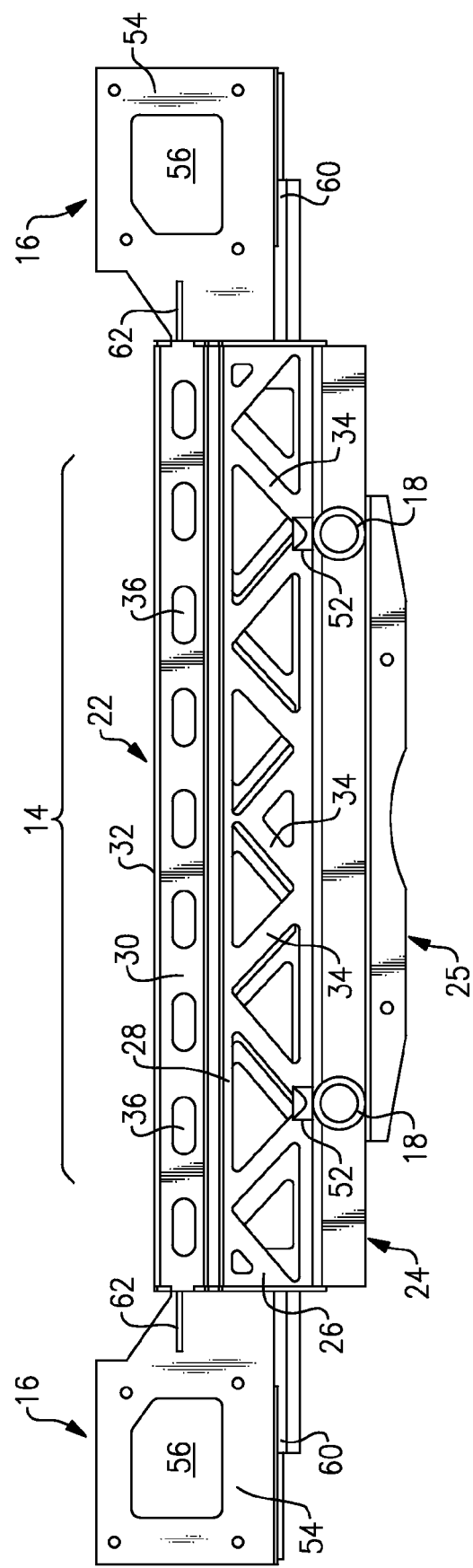
FIG. 3 is a rear elevation thereof.

The structure of the carrier support device, including the tri-beam open core beam construction of the support beam 14, is shown in FIGS. 1 and 3, with reference to other Drawing Figures that show details thereof.

The support beam 14 is formed of an upper portion 22 and lower portion 24, which are formed of sheet steel, cut and bent into shape, and which are welded together. A transverse lower transverse brace member 25 is attached to the underside of the ports 18.

The upper beam portion 22 is formed to have a main web portion 26 that is somewhat vertical and faces proximally (i.e., to the rear of the vehicle). A horizontal upper flange 28 extends forward, or distally, from the upper edge of the web portion 26. A vertical web portion 30 extends upward from the distal edge of the flange 28, and a rear or proximal extending flange 32 is formed at the upper edge of the web portion 30. This structure is shown in FIGS. 6A and 6B, discussed below. The main web portion 26 has a series of triangular cutouts extending across it, which result in a series of diagonal struts 34. This structure relieves much of the weight of the upper beam portion without sacrifice of strength or of resistance to torsional forces resulting from a towed or carried load. There are also oval cutouts 36 across upper web portion 30.

The lower beam portion 24 is formed to have a distal web portion 38, which is disposed in a generally vertical plane, with a generally horizontal lower flange 40 that extends proximally from the lower edge of the web portion 38. A downward depending flange or lip 42 extends vertically downward from the rear or proximal edge of the lower flange 40. The web portion 38 of the lower beam portion 24 has a series of triangular cutouts extending across it, which results in a series of diagonal struts 44. A series of weight-relieving oval cutouts 46 extends across the lower flange 40. There are a pair of open cutouts 48 spaced horizontally apart on the flange or lip 42, and these cutouts receive the two socket members 18, 18. The structure of the lower beam portion 24 is also shown in FIGS. 5A and 5B, to be described below.

As better shown in FIG. 6A, there are cutouts 50, 50 at the lower edge of the web portion 26 and these cutouts accommodate a pair of pin tubes 52, 52. The pin tubes 52 assist in retaining the attachment rods 20 for the carrier 12 when inserted into the socket members 18. Detail of the pin tube 52 is shown in FIG. 4.

The attachment lands 16, at either end of the transverse support beam 14, are each formed to have a generally square plate or ear member 54, in which there is a generally rectangular weight-relieving cutout 56, leaving a surrounding frame, with a set of bolt holes 58 in the periphery of the frame. These bolt holes 58 fit over bumper-attachment threaded posts in the vehicle bumper attachment pads. Each of the lands 16 also has a horizontal reinforcing flange 60 at the lower edge of the plate member 54. At each side, a generally triangular gusset 62, spaced above the flange 60, reinforces the connection of the attachment land to the support beam 14.

The ends of the support beam 14 are closed off by respective left and right side plates 64, and the attachment lands 16 are affixed to the side plates. This structure is shown in the side elevational view of FIG. 2.

FIG. 5A depicts the lower portion 24 of the horizontal support beam, here as a cut, flat blank, showing bend lines L-1 and L-2. The flange 42 is bent down ninety degrees at the bend line L-1, and the web portion 38 is bent up ninety degrees at the bend line L-2, resulting in the Z-shape lower portion 24 shown in profile in FIG. 5B.

FIG. 6A depicts the upper portion 22 of the horizontal support beam, here as a cut but flat blank, showing bend lines L-3, L-4 and L-5. The web 26 is bend down sixty degrees at the bend line L-3, the upper web portion 30 is bent up about 72 degrees at the bend line L-4, and the flange 32 is bent up about 90 degrees at the bend line L-5. This results in the upper portion 22 having a generally hook shape profile, as shown in FIG. 6B.

The upper and lower portions 22 and 24 are joined together and welded at weld lines W-1 and W-2, shown in FIG. 7, resulting in the modified open tube beam profile shown in that view. The beam 14 has somewhat the shape of a truncated triangle in profile, with the lower flange 40 serving as the base of the triangle, and the upper flange 28 cutting off the upper vertex. The flange 28, web 30 and uppermost flange 32 create a channel beam portion, which can accommodate the bumper mount structure, i.e., crash bar.

Figure 8A:
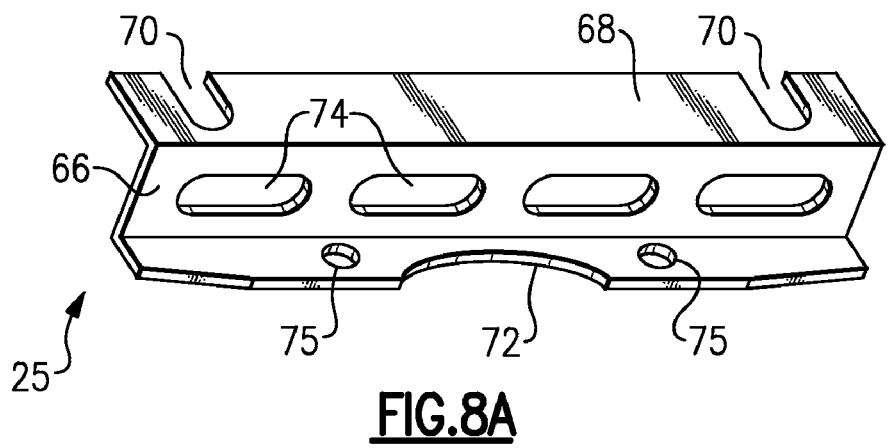
FIG. 8A is a bottom perspective view of a lower brace member of this embodiment.
Figure 8B:
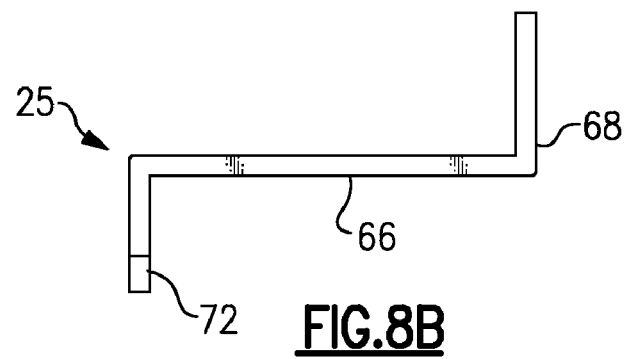
FIG. 8B is a cross section showing the profile thereof.

The lower brace member 25 is shown in FIG. 8A, which is a perspective from below, and 8B, which is a cross section of the brace member. The brace member is an elongated bent bar, with a generally horizontal web 66, and with an upwardly bent flange 68 at the proximal (i.e. rearward) side. There are open cutouts 70 spaced laterally from one another on the free edge of the flange 68, and these are sized to fit over the forward part of the tubular sockets 18. The position of the flange 68 on socket 18 can be seen from the side view of FIG. 3. A downwardly bent distal flange 72 is formed at the forward or distal side of the web 66. There are oval cutouts 74 in the web 66 which relieve some of the weight of this brace member 25.

Figure 9:
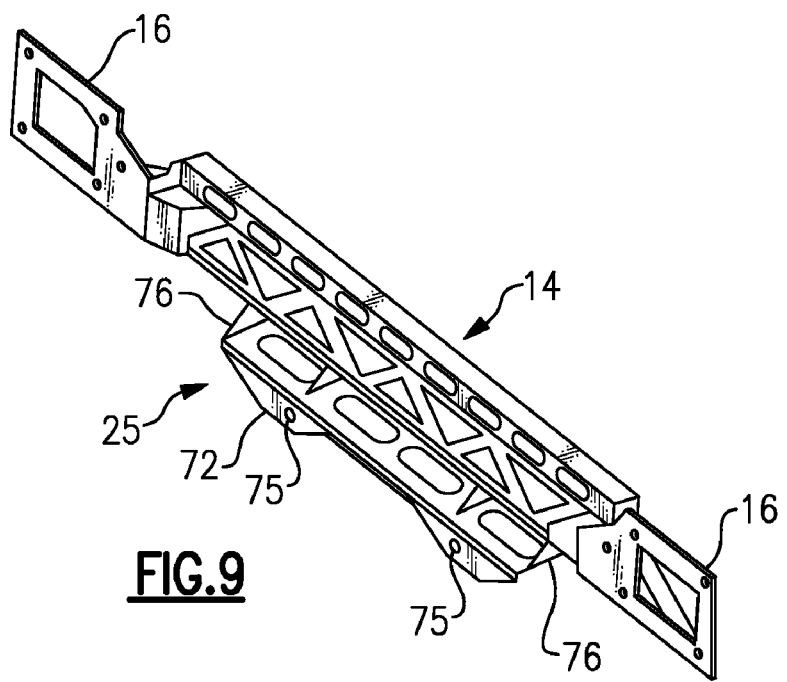
FIG. 9 is a front (i.e., distal) perspective view of the carrier support device.

As shown in FIG. 9, the brace member 25 has mounting holes 75 that can be used for securing the brace member 25 to a structural member, e.g., to a wall of a spare tire well of the vehicle. Here, there are additional generally triangular gussets 76 securing the lower brace member 25 to the remainder of the support beam 14.

While the invention has been described with reference to a specific preferred embodiments, the invention is certainly not limited to those precise embodiments. For example, the transverse beam member 14 could be extruded of an aluminum alloy, providing further weight savings. The shape and portions of the tri-beam modified tube beam can be varied within the main principles of this invention. Also, for some applications, reinforced synthetic materials can be employed for some of the components. Rather, many modifications and variations will become apparent to persons of skill in the art without departure from the scope and spirit of this invention, as defined in the appended claims.

I claim:

1. A carrier support for attaching to a motor vehicle between a set of rear bumper attachment pads of the motor vehicle and a bumper crash bar on which a rear bumper is mounted; the carrier support comprising:
   a transverse support beam;
   left and right support lands formed at ends of the transverse support beam and adapted to be mounted onto respective ones of the bumper attachment pads; and
   a pair of spaced-apart tubular socket members affixed to said transverse support beam and extending rearward therefrom, said tubular socket members being adapted to receive attachment rods of a carrier device to that is to be removably supported thereon;
   wherein said transverse support beam is a modified hollow tubular beam having a lower flange and an upper flange, a rearward web member and a forward web member, with said web members extending between forward and rearward portions of said upper and lower flanges; and wherein each of said forward an rearward web members has a plurality of triangular cutouts formed therein to define a series of diagonal struts thereon; and wherein said transverse support beam further comprises a lower reinforcing lip extending downward from a rear edge of said lower flange, and said lower reinforcing lip has a pair of spaced cutouts therein adapted for receiving said tubular socket members, with the latter being affixed thereto.

2. The carrier support of claim 1, wherein said support beam has a cross section that is generally trapezoidal, with the rearward web member being angled forward from a junction with the lower web towards said forward web member.

3. The carrier support of claim 1, further comprising left and right end plates disposed transversely to said upper flange, lower flange, forward web member and rearward web member, and affixed at left and right ends thereof, respectively, with the left and right support lands respectively extending outward therefrom.

4. The carrier support of claim 1, wherein said lower flange has a series of weight-relieving cutouts extending therealong.

5. The carrier support of claim 1, comprising a transverse support brace affixed at an underside of the tubular socket members.

6. The carrier support of claim 1, said transverse support beam further comprising a vertical web member extending upward from a forward edge of said upper flange, and a reinforcing lip extending rearward from an upper edge of said vertical web member.

7. The carrier support of claim 6, wherein said vertical web member includes a series of weight-relieving cutouts extending therealong.

8. The carrier support of claim 1, wherein said left and right support lands are each formed of a vertical attachment plate portion having a lower edge, and a horizontal flange extending rearwardly from said lower edge.

9. The carrier support of claim 8, wherein vertical attachment plate portions of each of said support lands are in the form of a rectangular frame defined by a central cutout formed therein; and attachment openings formed in the rectangular frame outside said central cutout.

10. A carrier support for attaching to a motor vehicle between a set of rear bumper attachment pads of the motor vehicle and a bumper crash bar on which a rear bumper is mounted; the carrier support comprising:
   a transverse support beam of a modified hollow tubular beam construction being formed of a first sheet and a second sheet of structural metal which are welded together; with the first sheet including a forward vertical web, a lower flange extending rearwardly from a bottom edge of the forward web, and a reinforcing lip extending downward from a rear edge of the lower flange; with the second sheet including a rearward web which is welded to said lower flange, an upper flange extending generally forward from an upper edge of the rearward web, an upper edge of said forward web being welded to said upper flange, and a vertical web member extending upward from a forward edge of said upper flange; and wherein a plurality of generally triangular cutouts are formed in at least one of said forward web and said rearward web to define a series of diagonal struts therein;
   left and right support lands formed at ends of the transverse support beam and adapted to be mounted onto respective ones of the bumper attachment pads; and
   a pair of spaced-apart tubular socket members affixed to said transverse support beam and extending rearward therefrom, said tubular socket members being adapted to receive attachment rods of a carrier device to that is to be removably supported thereon, wherein said spaced-apart tubular socket members are affixed onto said lower flange and extend through cutouts in said reinforcing lip.

11. The carrier support of claim 10, wherein said first and second sheets are formed of a sheet steel of a thickness of 0.105 to 0.145 inches.

12. The carrier support of claim 10, wherein said transverse support beam has a generally trapezoidal cross section.

13. The carrier support of claim 10, wherein said second sheet further includes a reinforcing lip extending rearward from an upper edge of said vertical web member.

14. The carrier support of claim 10, further comprising a transverse support brace of a Z-profile beneath said tubular socket members.

* * * * *